Oct. 11, 1938.   H. D. STEVENS ET AL   2,132,834
TIRE BUILDING FORM
Filed Jan. 22, 1935   5 Sheets-Sheet 1

INVENTOR
Horace D. Stevens &
Raymond W. Allen
BY
Albert L. Ely
ATTORNEY

Oct. 11, 1938.  H. D. STEVENS ET AL  2,132,834
TIRE BUILDING FORM
Filed Jan. 22, 1935  5 Sheets-Sheet 3

INVENTOR
Horace D. Stevens &
Raymond D. Allen
BY
Albert L. Ely
ATTORNEY

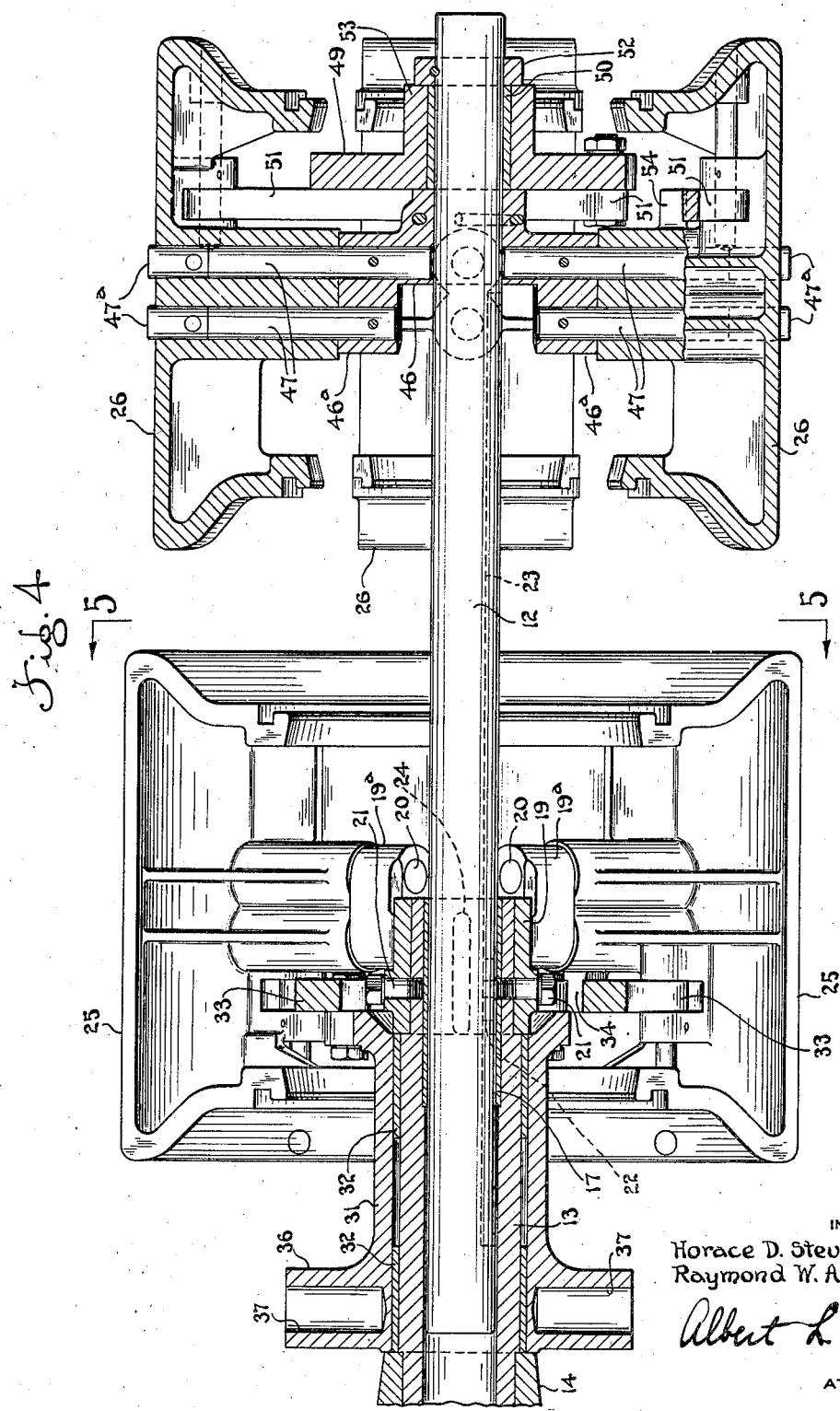

Oct. 11, 1938.  H. D. STEVENS ET AL  2,132,834
TIRE BUILDING FORM
Filed Jan. 22, 1935   5 Sheets-Sheet 5
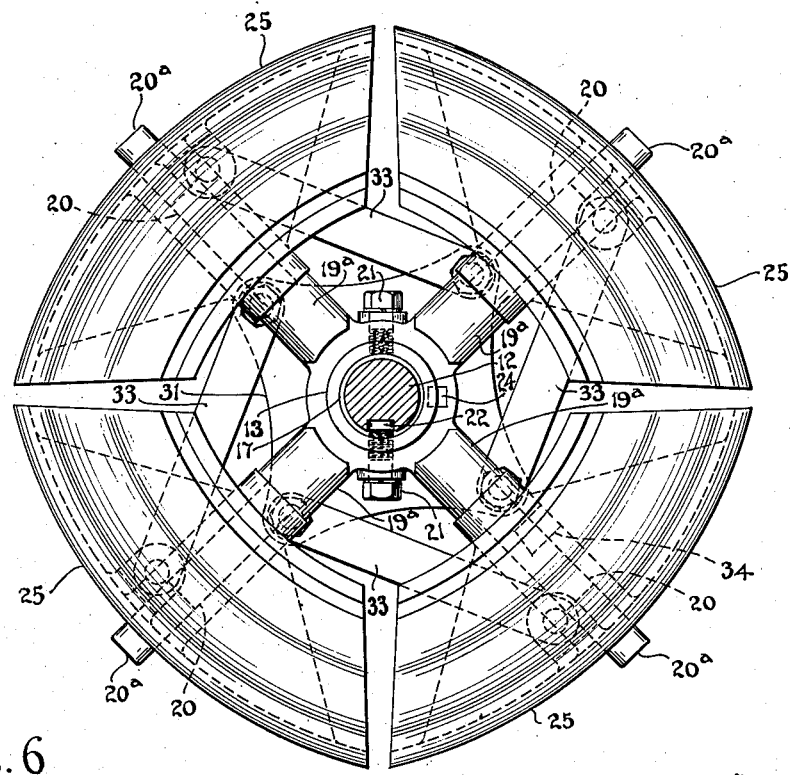
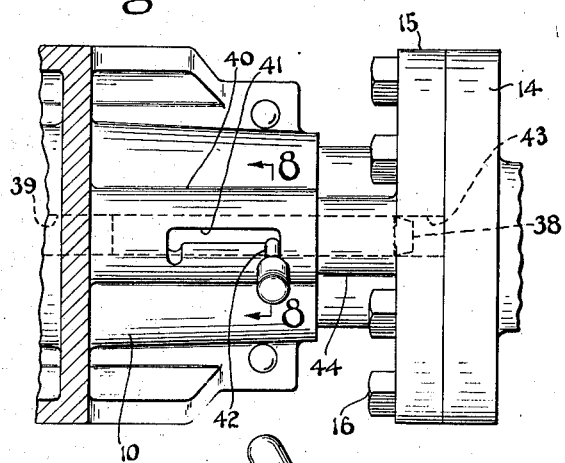
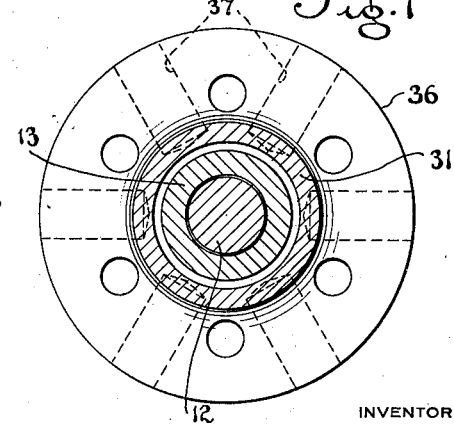
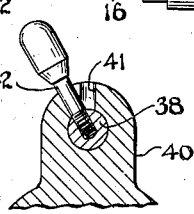
INVENTOR
Horace D. Stevens &
Raymond W. Allen
Albert L. Ely
ATTORNEY Patented Oct. 11, 1938

2,132,834

UNITED STATES PATENT OFFICE 2,132,834

TIRE BUILDING FORM

Horace D. Stevens and Raymond W. Allen, Akron, Ohio, assignors to The Firestone Tire & Rubber Company, Akron, Ohio, a corporation of Ohio Application January 22, 1935, Serial No. 2,882

7 Claims. (Cl. 154—9)

This invention relates to tire building forms or drums of the collapsible type, and more especially it relates to collapsible forms used for the fabrication of tire bands in semi-flat form.

In the fabrication of tire bands for heavy duty tires such as comprise dual bead cores, it is essential that the latter and adjacent bead structure of the tire be arranged substantially in the same angular positions they have in the finished tire, such arrangement preventing twisting and distortion of the beads in the subsequent shaping of the band to tire form. Modern practice is to construct tires with relatively small bead diameter, and tire building drums for constructing heavy duty tires of the character described require to be of such large radial area that much difficulty has been encountered in the past in providing building drums that will collapse sufficiently to permit removal of the tires built thereon.

The chief object of the invention is to provide an improved tire building drum that will collapse sufficiently to permit heavy duty tires easily to be removed therefrom. More specifically the invention aims to provide an improved sectional collapsible drum wherein some of the sections are collapsed and moved out of the operative plane of the drum before the other sections are collapsed. Other objects are to provide simplicity of construction and ease and facility of assembling. Other objects will be manifest.

Of the accompanying drawings:

Figure 4 is a vertical section similar to Figure 2 showing the form in fully collapsed condition;

Figure 5 is a section on the line 5—5 of Figure 4;

Figure 6 is a section on the line 6—6 of Figure 2;

Figure 7 is a section on the line 7—7 of Figure 2; and

Figure 8 is a section on the line 8—8 of Figure 6.

Figure 2:
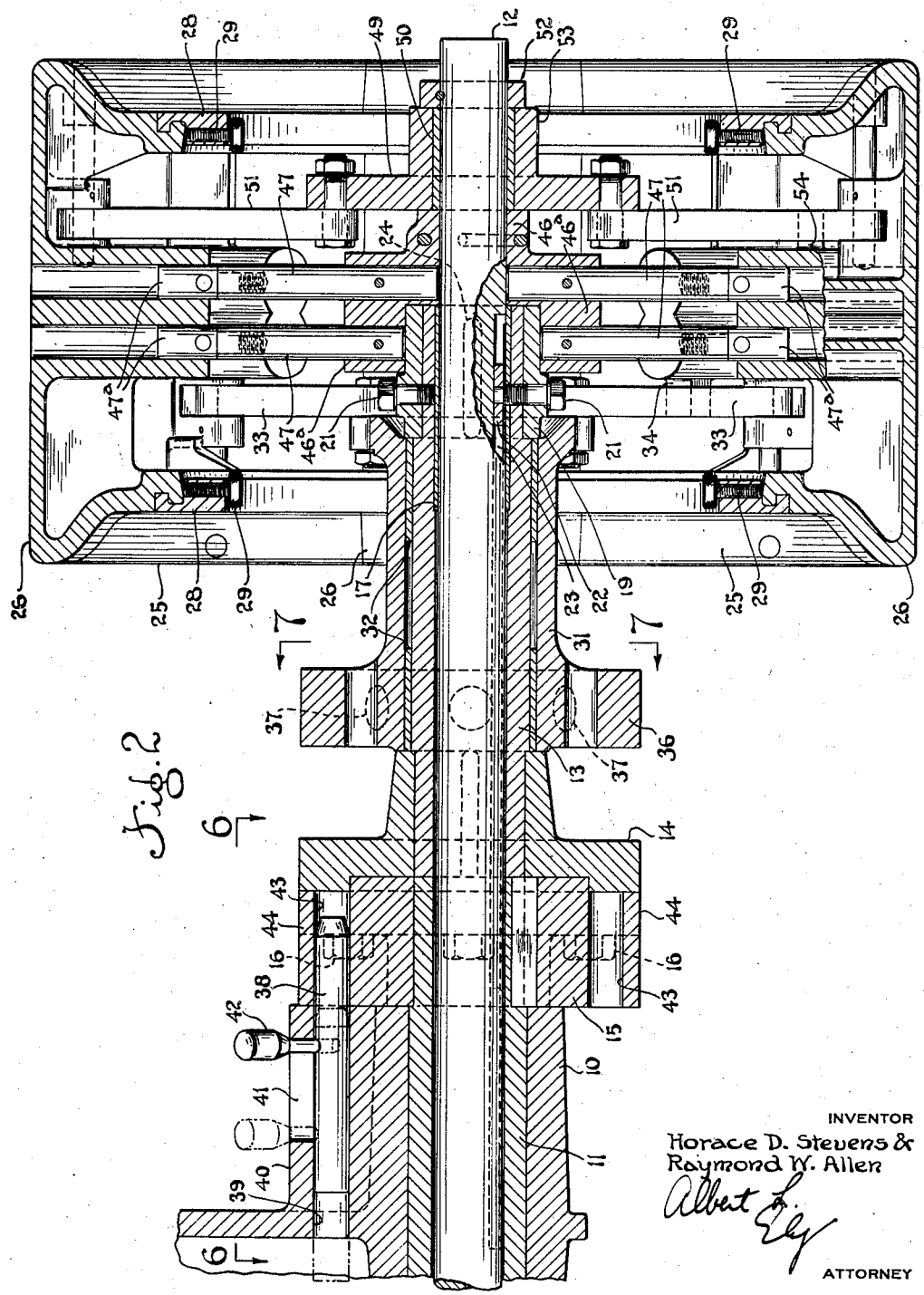
Figure 2 is a section on the line 2—2 of Figure 1.

Referring to the drawings, particularly Figure 2 thereof, 10 is the front main bearing of a tire building machine of known or preferred design, said bearing projecting outwardly from the machine, and 11 is a quill journaled in said bearing and projecting beyond the outer end of the same, said quill being arranged to be power driven by any suitable driving means (not shown). Mounted in the quill 11 is an axial spindle 12 that normally is driven by said quill, but is arranged for axial movement relatively thereof, upon occasion, as subsequently will be explained. Mounted upon the spindle 12, in extension of the quill 11, is a sleeve 13, and the latter and said quill are coupled to each other by means of a coupling member 14 keyed to sleeve 13 and a coupling member 15 keyed to quill 11, said coupling members being secured to each other by means of cap screws 16, 16, Figure 6. There is a bearing bushing 17 between the spindle 12 and the outer end portion of the sleeve 13.

Mounted upon the outer end of sleeve 13 is a spider 19 comprising four short, radially extending arms 19a, 19a, said arms being symmetrically disposed at right angles to each other, and each carrying two radially extending guide rods 20, 20, the guide rods of each pair being disposed in the same plane, which plane is parallel to the axis of spindle 12. As is most clearly shown in Figure 4, the spider arms 19a substantially overhang the end of sleeve 13 and the hub portion of the spider. To facilitate assembly of the device, and to adapt it to use with drums of various diameters, the guide rods 20 are made in two parts, each having an extension 20a threaded onto its outer end. It will be obvious that extensions 20a of various lengths may be provided according to the diameter of the drum in use. The spider 19 is secured to the sleeve 13 by a pair of cap screws 21, 21, one of which extends through bushing 17 and into engagement with a key 22 that is positioned within an elongate slot or keyway 23 extending longitudinally of spindle 12. Another key 24 between sleeve 13 and spider 19 may be provided if desired. The arrangement is such that quill 11 drives spindle 12 through the agency of sleeve 13 and key 22, yet permits axial movement of the said spindle relatively of said quill and sleeve. Slidably mounted upon each pair of guide rods 20 is an intermediate section 25 of a sectional tire building form or drum, which drum includes four key sections 26, 26 disposed between said intermediate sections.

Figure 1:
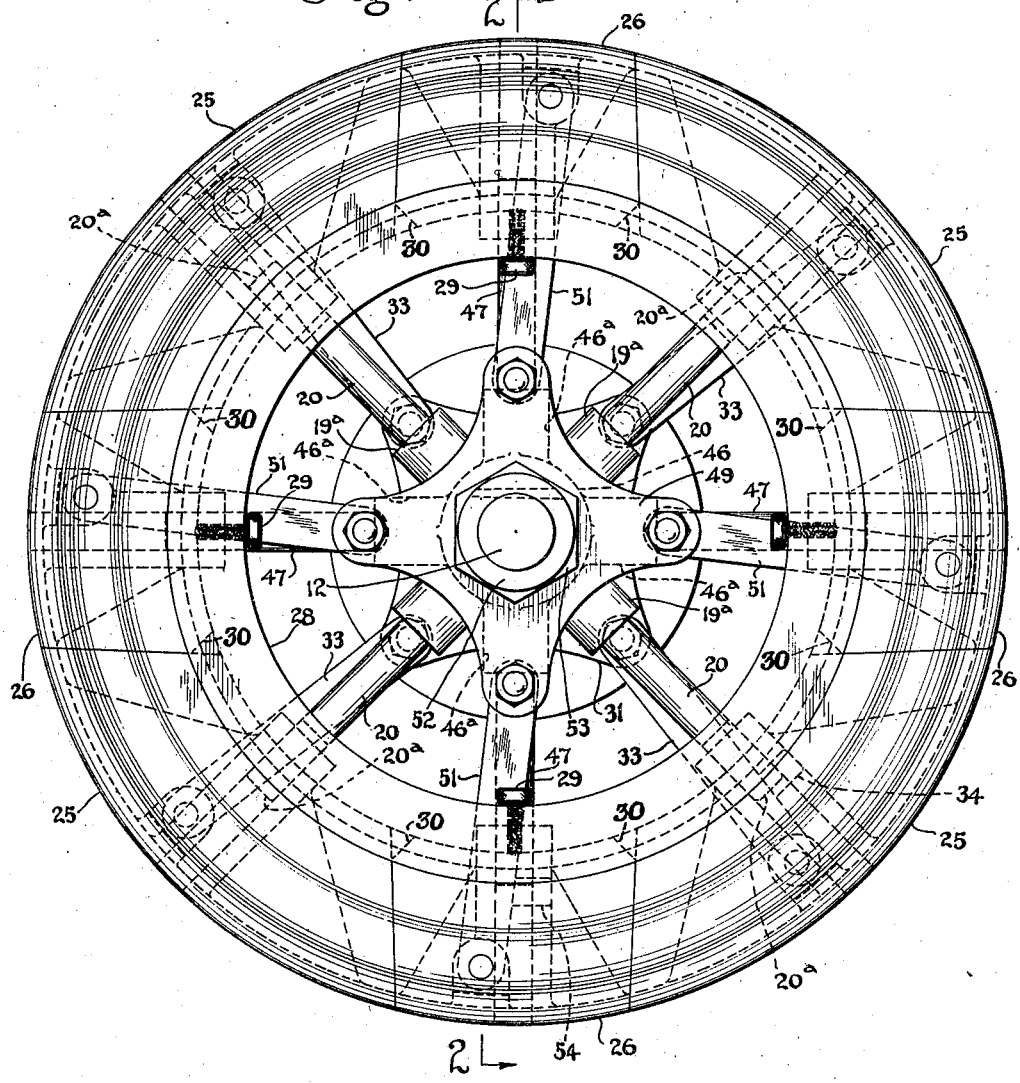
Figure 1 is an end elevation of the improved tire building form in normal expanded operative condition.
Figure 3:
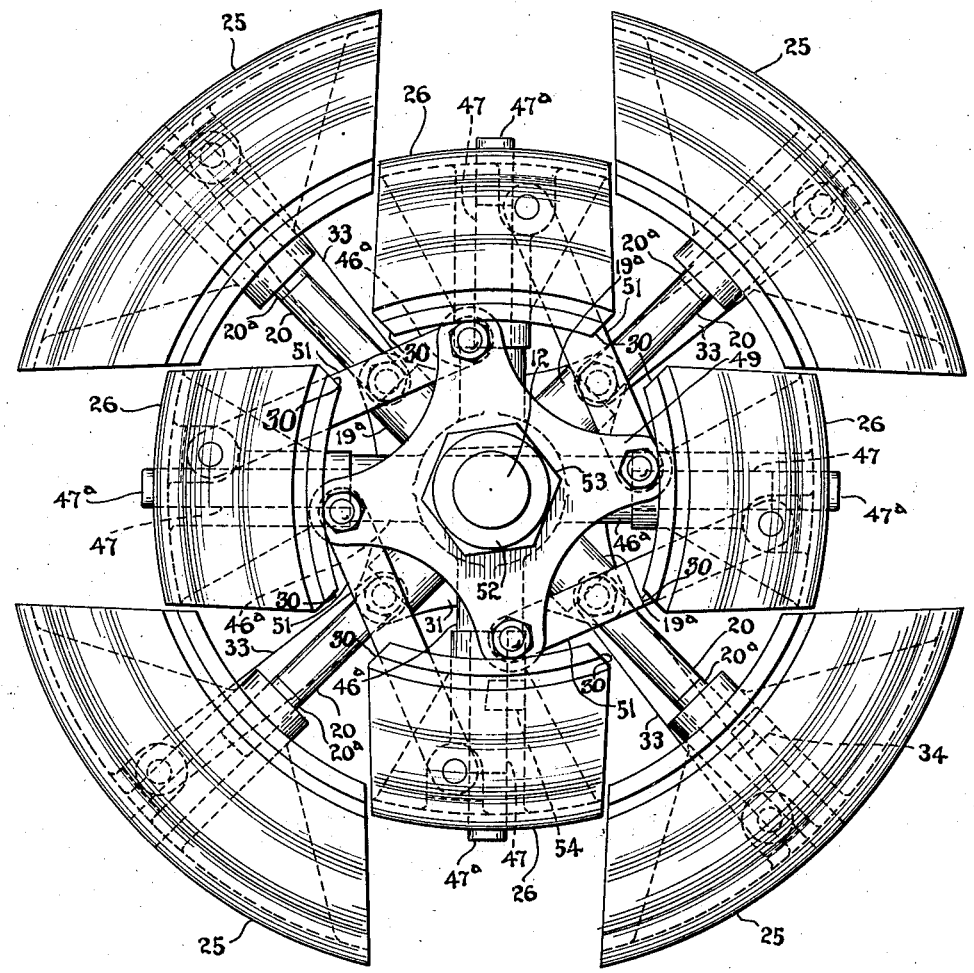
Figure 3 is a view similar to Figure 1 showing the form in partly collapsed condition.

As is most clearly shown in Figures 1 and 2, the tire building form comprises a pair of trimming rings 28, 28 formed with circumferential tongues and grooves that are adapted to interfit with complemental tongues and grooves on the inner periphery of the lateral portions of the drum. Set screws 29, 29 threaded radially through each ring and engaging the drum structure are provided for retaining the rings 28 in place on the drum. The rings 28 serve to increase the radial area of the drum, and constitute detachable stitching surfaces upon which tire building fabric and the tire beads may be mounted. The rings 28 hold the drum sections fixedly in their proper relative positions during the operation of building a tire on the drum. They also serve to cover and obscure notches in the inner circumference of the lateral portions of the drum, which notches are formed by the cutting off of the inner corners of the key sections 26, as shown at 30, 30, Figs. 1 and 3, to permit said key sections to pass the guide rods 20 when they are moved axially, relatively of the intermediate sections 25 of the drum. The rings 28 are removed from the drum before the latter is collapsed to remove a finished tire therefrom.

The intermediate sections 25 of the drum are moved radially inwardly in the collapsing of the drum, as shown in Figure 5, after the key sections 26 have been moved radially inwardly and then moved axially out of the operative plane of the drum. For drawing the said intermediate sections radially inwardly, an elongate spider 31 is journaled upon bearing bushings 32, 32 mounted upon sleeve 13, the end of said spider nearest spider 19 having four links 33, 33 pivotally connected thereto at equally spaced points, the other ends of said links being pivotally connected to the respective intermediate sections 25. The arrangement is such that angular movement of the spider 31 relatively of the sleeve 13 will move the drum sections 25 radially inwardly or outwardly. In the fully collapsed condition of the drum, the journals of the guide rods 20 on the drum sections 25 abut the ends of the respective spider arms 19a, as shown in Figure 5, whereby angular movement of the spider 31 relatively of sleeve 13 is limited in one direction. In the fully expanded condition of the drum, one of the links 33 abuts a lug 34 formed on one of the section structures 25, whereby angular movement of said spider 31 relatively of sleeve 13 is limited in the opposite direction.

The spider 31 is arranged to be manually rotated relatively of sleeve 13, and to this end said spider has its rear end formed with a radially extending flange 36 that is formed with a plurality of radially disposed sockets 37, 37 for the reception of a suitable lever (not shown) by which said spider may be rotated. In order that the spider 31 may be turned relatively of the sleeve 13 it is required that the latter be positively restrained against rotation, and for this purpose a slide bolt 38 is slidably mounted in a bore 39 formed in a boss 40 that extends longitudinally of bearing structure 10, on the upper side thereof, said bore 39 being parallel to the axis of spindle 12. The boss 40 is formed with a longitudinally extending slot 41 that extends into bore 39, and a hand lever 42 extends through said slot and is connected to said slide bolt. The ends of slot 41 have short, laterally extending portions in which the lever 42 may be positioned to hold the bolt 38 securely in projected or retracted position. In projected position the bolt 38 extends beyond the outer end of bracket 10 so that it may engage in one of a pair of bores or sockets 43, 43 formed in respective bosses 44 formed on coupling member 15 at diametrically opposite regions thereof. The arrangement is such that when slide bolt 36 is engaged in a socket 43 of member 15, as shown in full lines in Figure 2, rotation of spindle 12 and sleeve 13 positively is prevented.

The key sections 26 of the drum are supported from the spindle 12 by means of a spider 46 that is pinned to said spindle. The spider 46 is formed with four short, radially extending arms 46a, 46a, which arms overhang the spider on one end thereof, and are intercalated with the spider arms 19a of spider 19 in the operative, expanded condition of the drum, as shown in Figure 2. Each spider arm 46a carries two radially extending guide rods 47, 47 that are arranged similarly to the guide rods 20, and in the operative condition of the drum, the guide rods 20 and 47 are disposed in alternation in two parallel, vertical planes that are disposed transversely of the axis of spindle 12, as shown in Figure 2. Like the guide rods 20, each rod 47 has an extension 47a threaded onto its outer end. Slidably mounted upon each pair of guide rods 47 is a key section 26 of the tire building drum, said key sections being slidable radially on said guide rods from an innermost position in abutting relation to the spider arms 46a, as shown in Figure 4, in the collapsed condition of the drum, to an outermost position between and in operative continuity with the intermediate sections 25, as shown in Figure 1, in the expanded, operative condition of the drum.

For moving said key sections radially as described, a spider 49 is journaled upon a bearing bushing 50 on spindle 12, beside spider 46 thereon, said spider 49 having four links 51, 51 pivotally connected thereto at equally spaced points, the other ends of said links being connected to the respective drum sections 26. The spider 49 is restrained against axial movement toward the outer end of the spindle 12 by a collar 52 keyed to said spindle. The hub portion of spider 46 is polygonal in shape, as shown at 53, so that a suitable turning tool, such as a socket wrench (not shown) may be applied thereto for turning the spider 49 angularly relatively of the spindle 12 to the end that the drum sections 26 may be moved radially inwardly or outwardly. Angular movement of the spider 49 for moving the drum sections outwardly is limited by means of a lug or abutment 54 formed on one of said drum sections, which lug is engaged by one of the links 51 as the latter moves the drum section to ultimate position in the expanding of the drum.

Operation

For the building of pneumatic tire casings, the improved tire building drum is in the expanded condition shown in Figures 1 and 2, the bolt 38 and its operating lever 42 are in the position shown in broken lines in Figure 2, and the spindle 12 and sleeve 13 are power driven through the agency of the quill 11. When it is desired to remove a finished tire from the drum, rotation of the quill 11 is discontinued, the bolt 38 is projected outwardly into one of the sockets 43 of coupling member 15, as shown in full lines in Figure 2, and the trimming rings 28 are disengaged from the drum by loosening their set screws 29. The operator then applies a suitable wrench to the hub portion 53 of spider 49, and turns it angularly in the direction that causes links 51 to draw the key sections 26 of the drum radially inwardly, as is most clearly shown in Figure 3. In the innermost positions of key sections 26, the outer peripheral surfaces thereof are disposed inwardly of the beads of a tire built on the drum, so that said sections easily pass through the central opening of the tire. Said key sections are removed from the tire by the operator, who pulls the spindle 12 axially outwardly of the quill 11 and sleeve 14, whereby the key sections and mechanism connected thereto are moved out of the operative plane of the drum, as shown in Figure 4.

The operator then inserts a suitable lever in one of the sockets 37 of spider-flange 36, and by means of said lever rotates spider 31 in the direction to cause links 33 to draw the intermediate drum sections 25 radially inwardly to the positions shown in Figure 5. The finished tire may then be lifted off the intermediate sections 25 and passed axially over the collapsed key sections 26 and thus removed from the machine. The drum is restored to its original operative position by reversing the operations described.

The structure is easily and quickly adapted for use with tire building drums of various sizes and widths, and it achieves the other objects set out in the foregoing statement of objects.

Modification may be resorted to without departing from the spirit of the invention or the scope of the appended claims.

What is claimed is:

1. In a tire building drum of the type having a transversely flat peripheral portion and radially inwardly extending lateral working surfaces upon which at least the bead portions of a tire are built, the combination of a plurality of collapsible drum sections, means permanently connected to said sections for moving them relatively of each other to collapse the form, removable, endless rings mounted upon the respective sides of the drum, at the inner periphery thereof, so as to constitute inward detachable stitching surfaces in continuation of and coplanar with said lateral working surfaces, said rings interlocking with the drum structure through the agency of laterally extending tongue and groove connections so as to prevent movement of the drum sections relatively of each other, and means extending radially through said rings for securing them to the drum structure.

2. In a collapsible tire building form, the combination of inwardly movable groups of key sections and intermediate sections, a power-driven quill, a spindle keyed within said quill and movable axially thereof, means for supporting one of said groups of form sections upon said spindle, means journaled on the spindle and movable angularly thereof for moving the form sections on the spindle inwardly, means for supporting another group of form sections upon the quill, and means movable angularly relatively of the quill for moving the last mentioned form sections inwardly, after the first mentioned form sections have been moved inwardly and laterally out of the operative plane of the form.

3. A combination as defined in claim 2 including means for locking the quill against rotation during intervals when it is not being driven.

4. In a collapsible tire building form, the combination of a group of key sections and a group of intermediate sections, a power-driven quill, a spindle keyed within said quill and movable axially thereof, a spider fixed to said quill and formed with overhanging arms, a pair of radially disposed guide rods carried by each of said spider arms upon which an intermediate form section is slidably mounted, said guide rods being disposed on opposite sides of the central plane of the form, a second spider fixed to the spindle and formed with overhanging arms adapted to be intercalated with the arms of the first mentioned spider, a pair of radially disposed guide rods carried by each arm of the second spider, which guide rods are disposed in the same planes as the first mentioned guide rods, on opposite sides of the central plane of the form, there being a key section mounted upon each pair of said last mentioned guide rods, means carried by the quill for radially moving the intermediate form sections longitudinally of their guide rods, and means carried by the spindle for radially moving the key sections longitudinally of their guide rods.

5. A combination as defined in claim 4 in which the means for radially moving the intermediate form sections and key sections are swiveled on the quill and spindle respectively.

6. A combination as defined in claim 4 including means for locking the quill to a fixed structure to prevent rotation of the quill during the collapsing and expanding of the form.

7. In a tire building form of the type having a transversely flat peripheral portion and radially inwardly extending lateral portions upon which at least the bead portions of a tire are built, the combination of a plurality of radially movable form sections, means connected to said sections for moving them radially, relatively of each other, to collapse the form, certain of said sections being cut away at the opposite ends of their radially innermost portions to permit maximum collapsing movement, and rings mounted upon the respective sides of the form to span said cut away regions and to provide stitching surfaces on the sides of the form.

HORACE D. STEVENS.
RAYMOND W. ALLEN.